May 26, 1959 W. J. L. KEARNS 2,888,333
HOOD
Filed July 30, 1956 3 Sheets-Sheet 3

Inventor
William J. L. Kearns
by Stevens, Davis, Miller & Mosher
his attorneys

United States Patent Office 2,888,333
Patented May 26, 1959

2,888,333

HOOD

William J. L. Kearns, Corunna, Ontario, Canada, assignor to Polymer Corporation Limited, Sarnia, Ontario, Canada, a corporation of Canada Application July 30, 1956, Serial No. 601,085

1 Claim. (Cl. 23—288)

This invention relates generally to gas dispersion hoods. While hoods of this type may advantageously be used in reactors for carrying out various processes, it is more particularly suited for use in a reactor for carrying out processes wherein contact material is contacted with a fluid and which involve periodic changes of such contact material. One example of such process is in a reactor for the catalytic dehydrogenation of olefins having at least four carbon atoms in the olefinic chain, for example, in the dehydrogenation of n-butylene to butadiene-1,3.

It is now well known to dehydrogenate n-butylene to butadiene-1,3 in the presence of catalysts. One such catalyst is the potassium oxide promoted iron oxide catalyst disclosed in United States Patent No. 2,426,829, issued September 2, 1947, to Kenneth K. Kearby. Another group of suitable catalysts is that in which the active ingredient is calcium nickel phosphate, and with which the dehydrogenation reaction usually takes place in the presence of steam and at a temperature of 950–1350° F. One such catalyst is the pelleted calcium nickel phosphate-chromium oxide catalyst disclosed in United States Patent No. 2,442,320, issued May 25, 1948, to Andrew J. Dietzler et al.

In the use of these catalysts in the presence of steam, the manner of introducing the hydrocarbon and the steam is critical, since, if the reactants are introduced improperly, the dehydrogenation reaction does not proceed in the optimum manner.

One method of introducing the hydrocarbon and steam into a dehydrogenation reactor containing a dehydrogenation catalyst involves the use of a pair of vertically spaced, horizontal, hollow, annular members. The lower such member, which admits the steam, is equipped with a plurality of downwardly extending pipes positioned along the lower surface of the periphery of such member. Each pipe terminates in a diverging frusto-conical portion. The upper such member, which admits the hydrocarbon, is also equipped with a plurality of downwardly extending pipes positioned along the lower surface of the periphery of such member. Each of these hydrocarbon-containing pipes is joined to its respective downwardly extending steam-containing pipe. In such apparatus, known as thermocompressors, the steam and hydrocarbon are first intimately mixed and then the mixture is distributed over a portion of the surface of the catalyst bed. In order to force the reaction mixture downward, a hood is used which surrounds the discharge end of each thermocompressor. However, such conventional distributors do not uniformly distribute the reactants over the bed of contact material.

Furthermore, when it is desired to recharge the reactor, a process which occurs periodically at about six to nine month intervals, it is necessary partially to dismantle the injection system, remove it from the reactor, charge the reactor and then reassemble the injection system. Such procedure is obviously undesirable.

In a manner proposed by the present applicant for introducing the hydrocarbon and steam to the reactor so that the dehydrogenation reaction proceeds in an optimum manner, a mixture of steam and hydrocarbon is admitted to the reactor at a relatively high velocity by means of a central downcomer of relatively small cross-section to which is attached a suitable distributor which converts the gaseous stream from one of high velocity and small cross-section to one of lower velocity and larger cross-section. Employing such central distributor, the reactant fluids may be uniformly distributed over substantially the entire surface of the catalyst bed. However, it was found that the residence time of the hydrocarbon at the reaction temperature prior to contact with the catalyst was increased when an internal distribution system consisting merely of a downcomer and distributor was used.

It is therefore an object of the present invention to disclose a gas dispersion hood which, when used in conjunction with such hereinbefore described distributor system, permits the residence time of the hydrocarbon at the reaction temperature prior to contact with the catalyst to be kept to a minimum.

It is a further object of the present invention to disclose a dispersion hood which facilitates the charging of material into and removal of material from the reactor.

It is a still further object of the present invention to disclose a dispersion hood which is located within a reactor used in the catalytic dehydrogenation of n-butylene to butadiene-1,3, said hood cooperating with a centrally disposed internal distributor system to enable the catalyst to be charged into and be discharged from the reactor simply by withdrawing only the downcomer from the reactor thereby allowing the hood to remain in the reactor.

These and other objects of the present invention are achieved in a reactor consisting of a shell containing a static bed of contact material and equipped with inlet and outlet means, and a funnel assembly, said funnel assembly comprising a downcomer attached to the inlet means, a distributor integral with said downcomer and a frusto-conical hood surrounding said distributor, and extending downwardly and outwardly from the discharge end of said downcomer, said hood comprising a plurality of sectors each independently movable between a closed operative position and an open access position.

The term "cone" is taken to mean "the three dimensional figure bounded by a conical surface (lateral surface) whose directrix is a closed curve, and a plane (base) which cuts all the elements." In the above definition, the term "conical surface" is taken to mean "a surface generated by a moving straight line (generator) which always intersects a fixed plane closed curve (directrix) and which always passes through a fixed point (vertex) not in the plane of the curve," the term "element" is taken to mean "the generator from the vertex to the base," and the term "curve" is taken to mean "the locus traced by a point which periodically or continually deviates from a straight line." Thus, it is seen that the term "cone" includes those figures whose base is a circle, an ellipse or a polygon, and so is generic to the term "pyramid."

In this specification, the term "closed operative position" is taken to mean "that position of the independent sectors of the hood wherein such sectors are assembled to form a frusto-conical hood which serves to confine the reactants emerging from the centrally disposed distributor to that space between the catalyst bed and the hood." The term "open access position" is taken to mean "that position of the independent sectors of the hood wherein at least one, and preferably more than one is or are displaced from the closed operative position in such a manner as to allow free access to the catalyst bed."

In one embodiment of the invention, the independent sectors of the hood are trapezoidal in shape, and at least one, and preferably all, of such trapezoidal sectors is mounted for rotation perpendicular to its plane. In the preferred form of such mounting, the sector is rotatably mounted at its base about an axis substantially tangential to the periphery of the base of the hood. It is also within the scope of the present invention to reinforce the non-parallel sides of the trapezoidal sectors by means of ribs. Such ribs assist in retaining the sectors in assembled position, in a manner to be described hereinbelow.

In drawings which illustrate an embodiment of the invention,

Figure 1:
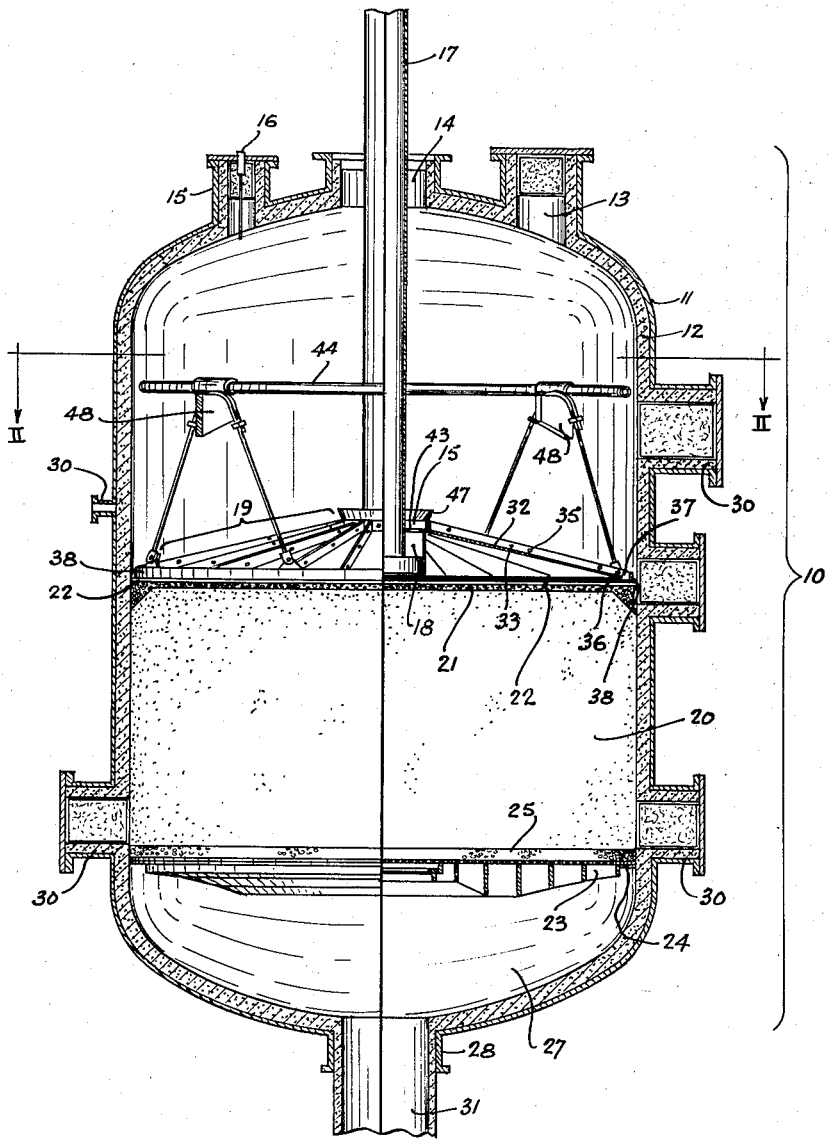
Fig. 1 is a section along line I—I of Fig. 2, showing the right hand side of the reactor in section, and the left hand side of the reactor in elevation.
Figure 2:
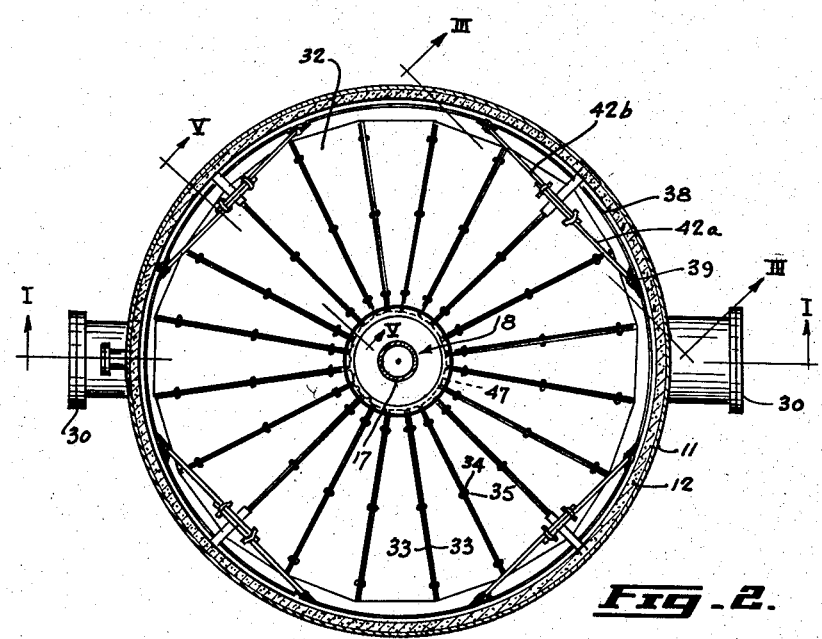
Fig. 2 is a top view of the dehydrogenation reactor containing one embodiment of the novel hood of the present invention, with the top part of the shell of such reactor above line II—II of Fig. 1 removed.
Figure 3:
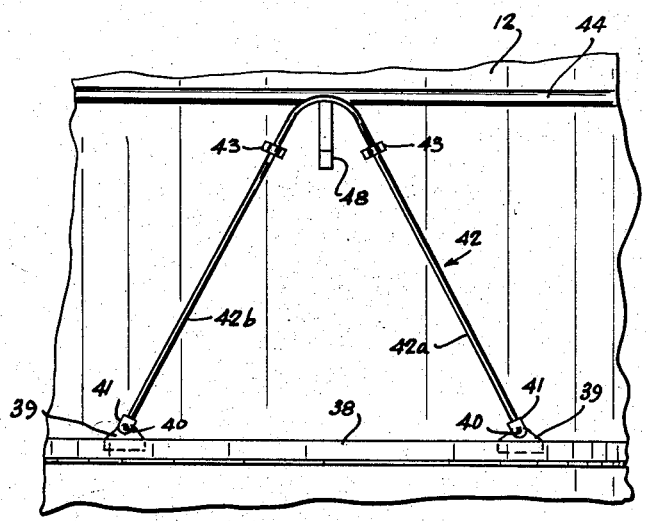
Fig. 3 is a section along line III—III of Fig. 2, showing in greater detail hanging means for limiting the downward movement of the hood.

The general arrangement of the hood in relation to the dehydrogenation reactor is best shown by Fig. 1. The dehydrogenation reactor, designated generally by reference numeral 10, consists of a cylindrical shell 11 and a lining 12. The top dome of the reactor is equipped with three openings, a manway 13, a reactant inlet 14, and an inlet 15 which contains blanketing steam inlet pipe 16. The reactor side walls also contain insulated manways 30. Extending through inlet 14 is downcomer 17 which admits intimately mixed hydrocarbon and steam to the reactor. At the lower end of downcomer 17 is distributor 18, and, disposed around the circumference of downcomer 17 and also surrounding distributor 18 is the novel hood of the present invention, designated generally by reference numeral 19.

The lower portion of the reactor contains a static catalyst bed 20, which is separated from the internal distribution system, consisting of downcomer 17, distributor 18 and hood 19, by means of Raschig rings 21 resting on bed 20 and a hold down screen 22 resting on Raschig rings 21. The catalyst bed is supported generally on grate 23. A screen 24 lies on grate 23, and the catalyst bed rests on Berl saddles 25 which lie on screen 24. The reactant gases leave the catalyst bed by means of grate 23, through space 27 and out through outlet 28 and outlet pipe 31.

Coming now to Figs. 2, 3, 4 and 5 the novel frusto-conical hood of the present invention is seen to consist of a plurality of identical trapezoidal sectors 32 having upturned edges 32a and 32b. The sectors are of suitable material, for example, stainless steel. The non-parallel sides of each of the trapezoidal sectors 32, are equipped with reinforcing ribs 33. Each pair of adjacent ribs have bored therethrough three registering holes 34 through which bolts 35 may pass. Similarly, each edge 32b has bored therethrough a hole 52. The purpose of these hereabove described elements will be further described hereinafter.

Each rib 33 is hinged, at its end adjacent the inner wall of the reactor 10, by means of a bolt 36 passing through registering hole in rib 33 and plate 37. Plate 37 is welded to an annular angle bracket 38. Edge 32b of sector 32 lies adjacent to the horizontal leg of bracket 38 to provide a substantially fluid tight contact. Welded to the vertical leg of bracket 38 and spaced circumferentially therealong are lugs 39. Passing through holes in the upper portion of lugs 39 are pins 40, which serve as the hinge connection between lugs 39 and the bifurcated end 41 of hairpin shaped supporting rods 42. Supports 42 are formed in two pieces, 42a and 42b, held together by means of connecting straps 43. The supports hang on inwardly radially projecting brackets 48. Thus, the hood is permitted vertical movement between positions in which brackets 48 retain supports 42 and in which bracket 38 rests upon screen 22 with supports 42 not resting on brackets 48. Thus it is seen that the supporting rods limit the downward movement of the hood. Resting on brackets 48 and welded thereto is ring 44, made up of four arcuate sections, which assists in retaining the sectors of the hood in open access position.

As described hereinabove, the lower portion of downcomer 17 consists of a distributor 18. Disposed circumferentially around distributor 18 is upper hood assembly angle ring 46. Supporting the assembly ring 46 are radial partial ribs 45 which serve also to reinforce the upper part of the distributor. Disposed around the distributor and radially spaced therefrom and connected to ring 46 is frusto-conical wall 47 which serves to guide the distributor, when it is being lowered into operative position after withdrawal for recharging the catalyst bed. The connection consists of a plurality of reinforcing straps 49 welded to the interior surface of ring 46 and to the exterior surface of wall 47. Passing through hole 52 in edge 32a of sector 32 and through registering holes in strap 49, and ring 46 are bolts 50. In combination with nuts 51, these bolts help retain the hood in closed operative position.

Figure 4:
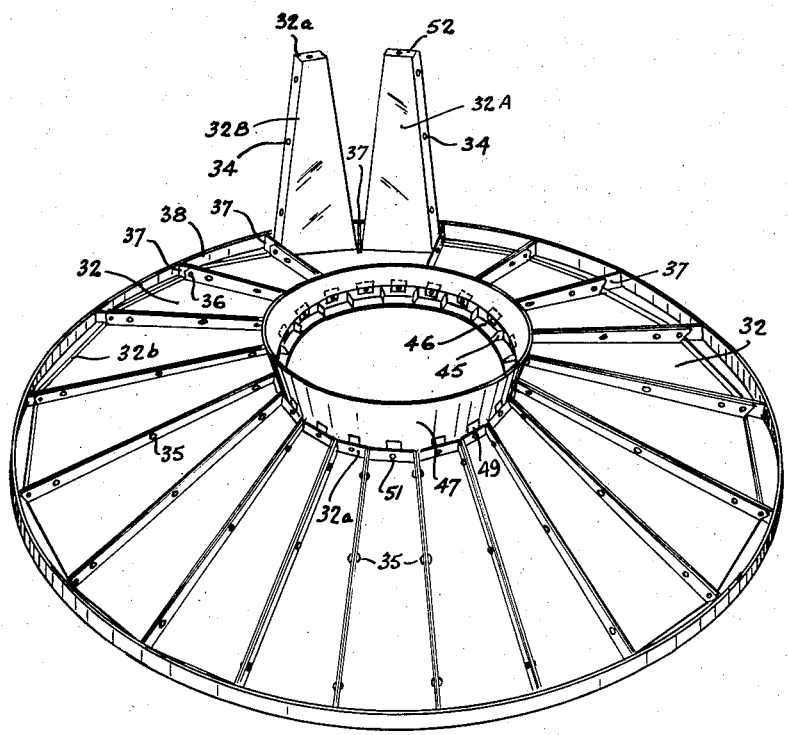
Fig. 4 is a perspective view of the hood removed from the reactor.
Figure 5:
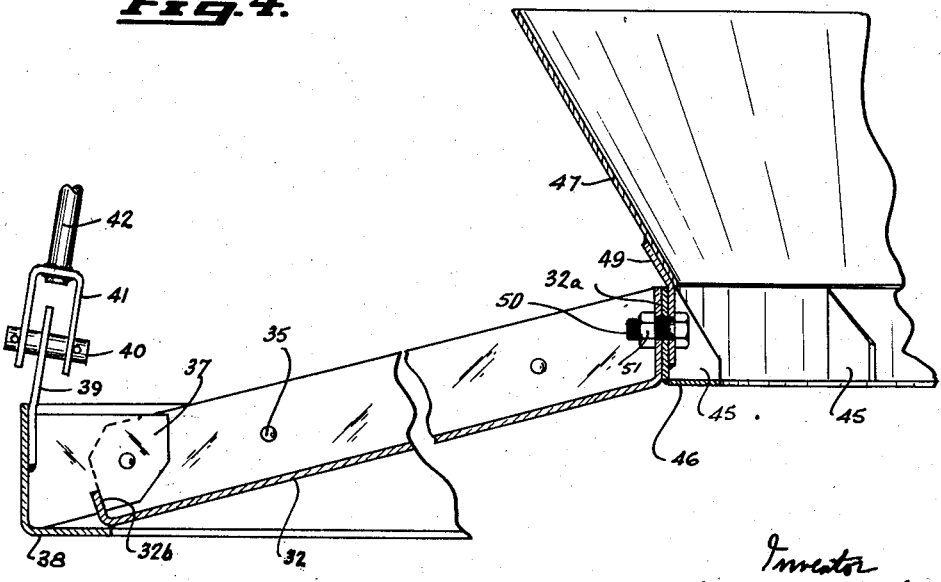
Fig. 5 is a section along line V—V of Fig. 2 partially broken away and on an enlarged scale.

The novel hood of the present invention may easily be disassembled and reassembled when it is desired to remove old catalyst and to recharge the reactor. As can be seen more readily in Fig. 4, each of the sectors of the hood are individually hinged at their bases about an axis substantially tangential to the periphery of the base of the hood. Thus, the sectors may be placed in open access position by raising and rotating them about the hinge and temporarily fastening them close to the inner side wall of the reactor. Figure 4 shows two such sectors, 32a and 32b in such open access position, while the remainder of such sectors 32 are in the closed operative position. In order that the sectors may so be raised, they are disconnected by removal of bolts 35 from each pair of sectors desired to be raised, and also by removing bolt 50 from hole 52. When it is desired to place the sectors of the hood in closed operative position the sectors are lowered until the upper portions of the trapezoidal sectors bear against the vertical leg of ring 46 with hole 52 in registry with the hole in ring 46, are bolted thereto by means of bolt 50 and nut 51, and then firmly secured by passing bolts 35 through holes 34.

While the embodiment described herein shows the sectors of the hood hingedly mounted at their bases about an axis substantially tangential to the periphery of the base of the hood, other methods are possible for mounting for movement between the herein defined closed operative position and open access position. For example, the sectors may be hingedly mounted at their bases about an axis substantially tangential to the periphery of the downcomer or of the distributor. Alternatively, for some purposes it may be desirable to hinge the sectors at their non-parallel sides.

What I claim is:

For use in a reactor of the type wherein the reactant passes axially through a static bed of contact material, said reactor being of a structure consisting essentially of a shell adapted to contain a static bed of contact material and equipped with inlet and outlet means, a downcomer attached to the inlet means and a distributor integral with said downcomer: a non-collapsible segmented hood, adapted to surround said distributor and to extend downwardly and outwardly from the discharge end of said downcomer, said hood being of a structure comprising, a plurality of substantially trapezoidal sectors, each of said sectors being independently rotatably mounted at its base about an axis substantially tangential to the periphery of the base of the hood, whereby the sectors may all be moved between a closed operative position, in which the hood has a frusto-conical cross-section for confining unreacted reactant in the vicinity of the contact material prior to the passage of such reactant through the contact material, and an open access position, in which the hood has a hollow cylindrical cross-section for permitting substantially unrestricted access to the static bed of contact material.

References Cited in the file of this patent

UNITED STATES PATENTS

| | | |
|---|---|---|
| 2,399,560 | Murphree | Apr. 30, 1956 |
| 2,767,066 | Zimmerman | Oct. 16, 1956 |